United States Patent [19]

Verber et al.

[11] 4,394,060
[45] Jul. 19, 1983

[54] LIGHT BEAM SCANNING SYSTEM WITH SAW TRANSDUCER

[75] Inventors: Carl M. Verber, Columbus; Richard P. Kenan, Upper Arlington; Richard Ridgway, Columbus, all of Ohio

[73] Assignee: Canon Kabushiki Kaisha, Tokyo, Japan

[21] Appl. No.: 254,470

[22] Filed: Apr. 15, 1981

[51] Int. Cl.³ .............................................. G02B 5/14
[52] U.S. Cl. ........................... 350/96.13; 350/96.12; 324/77 K
[58] Field of Search ............... 350/96.11, 96.12, 96.13, 350/96.31, 96.14; 333/151-155; 364/822, 821; 310/313 R; 330/107 A; 324/77 K

[56] References Cited

U.S. PATENT DOCUMENTS

| 4,253,060 | 2/1981 | Chen | 350/96.14 |
| 4,297,704 | 10/1981 | Marom et al. | 350/96.13 |
| 4,348,074 | 9/1982 | Burns et al. | 350/96.11 |

OTHER PUBLICATIONS

S. K. Yao, Guided-Wave Optical Thin-Film Luneburg Lenses: Fabrication Technique and Properties, Appl. Optics, 18, 4067 (Dec. 1979).
S. K. Yao, Theoretical Model of Thin-Film Deposition Profile with Shadow Effect, J. App. Phys., 50, 3390 (May 1979).
S. K. Yao, and D. B. Anderson, Shadow Sputtering Diffraction-Limited Waveguide Luneburg Lenses, App. Phys. Lett. 33, 307 (Aug. 1978).
T. Tamir, *Integrated Optics,* published by Spring Verlag, Inc. (1975), pp. 13-29; 83-90; 139-141; 167-189.
E. G. Lean, et al., *Thin Film Acousto-Optic Devices,* Proc. IEEE 64, 779 (1976).
Tsai, *Guided-Wave Acousto-Optics Fundamentals and Wideband Applications,* SPIE 139, 132, Guided Wave Optical Systems and Devices (1978).

*Primary Examiner*—David K. Moore
*Attorney, Agent, or Firm*—Fitzpatrick, Cella, Harper & Scinto

[57] ABSTRACT

A very compact light beam scanning system is provided by utilizing the optical integrated circuit technique. A Luneburg lens of $As_2S_3$ and a SAW transducer device are provided on a waveguide and a wideband heterodyning RF oscillator including two varactor tuned oscillators and a digital linearization circuit are provided as the drive circuit for the transducer device.

10 Claims, 2 Drawing Figures

LIGHT BEAM SCANNING SYSTEM WITH SAW TRANSDUCER

BACKGROUND OF THE INVENTION

1. Field of the Invention

This invention related to a system for scanning a light beam and more particularly it concerns a system for scanning laser light through an optical waveguide.

2. Description of the Prior Art

Devices for scanning a light beam have heretofore included a rotational polygon mirror for deflecting the beam. With such prior art devices, however, it has been impossible to obtain high scanning speed and a large deflection angle. In addition, overall system size has been very large.

There are also known devices which use a bulk type acousto-optical deflector instead of a rotational polygon mirror. Although it is possible to obtain high scanning speed with such devices, a large RF power source is required along with an auxiliary optical system to get a sheet beam.

There are still other devices which utilize the optical integrated circuit technique to modulate a light beam. For example, there has recently been published a technique of forming an acousto-optical deflector or an electro-optical modulator in a thin film waveguide path formed on a base to thereby form a light integrated circuit, as explained in T. Tamir, *Integrated Optics*, published by Springer Verlag, Inc. (1975). Further, a deflector utilizing the acousto-optic effect in a thin film waveguide path to diffract a parallel light beam by random access is disclosed in E. G. Lean, et al., *Thin Film Acousto-Optic Devices*, Proc. IEEE 64, 779 (1976). Also, an example of a transducer for generating an acoustic wave in a waveguide path over a wideband is disclosed in C. S. Tsai, *Guided-Wave Acousto-Optics Fundamentals and Wideband Applications*, SPIE 139, 132, Guided Wave Optical Systems and Devices (1978). However, none of these publications disclose a compact device for scanning a light beam with a small RF power source to form a large number of discrete points.

SUMMARY OF THE INVENTION

The present invention avoids the disadvantages of the prior art by means of a novel scanning system which is very compact, has high scanning speed and sweep rate, has a large number of resolvable points, with good linearity, requires a small RF power source, and which does not require precise adjustment during assembly.

According to one aspect of the present invention there is provided a scanning system comprising an optical waveguide, SAW transducer means, and driving means for the SAW transducer means including a heterodyning RF sweep generator having a varactor tuned oscillator and a constant frequency oscillator. This construction makes it possible to realize a wide deflector angle and high sweep rate. The transducer means may preferably be a tilted SAW transducer array.

In order to form discrete points, the light for the scanning system must be modulated in synchronism with the acoustic sweep. This synchronism may preferably be done by using the driving means to control the modulation of the light.

According to another aspect of the invention there is provided a scanning system comprising an optical waveguide, SAW transducer means, and driving means for the SAW transducer means including a varactor tuned oscillator and a digital linearization circuit to achieve good linearity of the frequency of the varactor tuned oscillator. The transducer means may preferably be a tilted SAW transducer array and the driving means may preferably be used to synchronize the modulation of the scanning light.

According to a further aspect of the invention there is provided a scanning system comprising an optical waveguide, an $As_2S_3$ Luneburg lens provided on the waveguide, SAW transducer means, and driving means for the SAW transducer means. The waveguide may preferably be Ti in-diffused $LiNbO_3$.

There has thus been outlined the more important features of the invention in order that the detailed description thereof that follows may be better understood and in order that the present contribution to the art may be better appreciated. There are, of course, additional features of the invention which will be described hereinafter and which will form the subject of the claims appended hereto. Those skilled in the art will appreciate that this invention may be utilized as a basis for designing other structures for carrying out the several objects of the invention. It is therefore important that the claims be regarded as including such equivalent constructions as do not depart from the scope of the invention.

BRIEF DESCRIPTION OF THE DRAWINGS

One embodiment of the invention has been chosen for purposes of illustration and description and is shown in the accompanying drawings forming a part of the specification, wherein.

DETAILED DESCRIPTION OF THE PREFERRED EMBODIMENT

Figure 1:
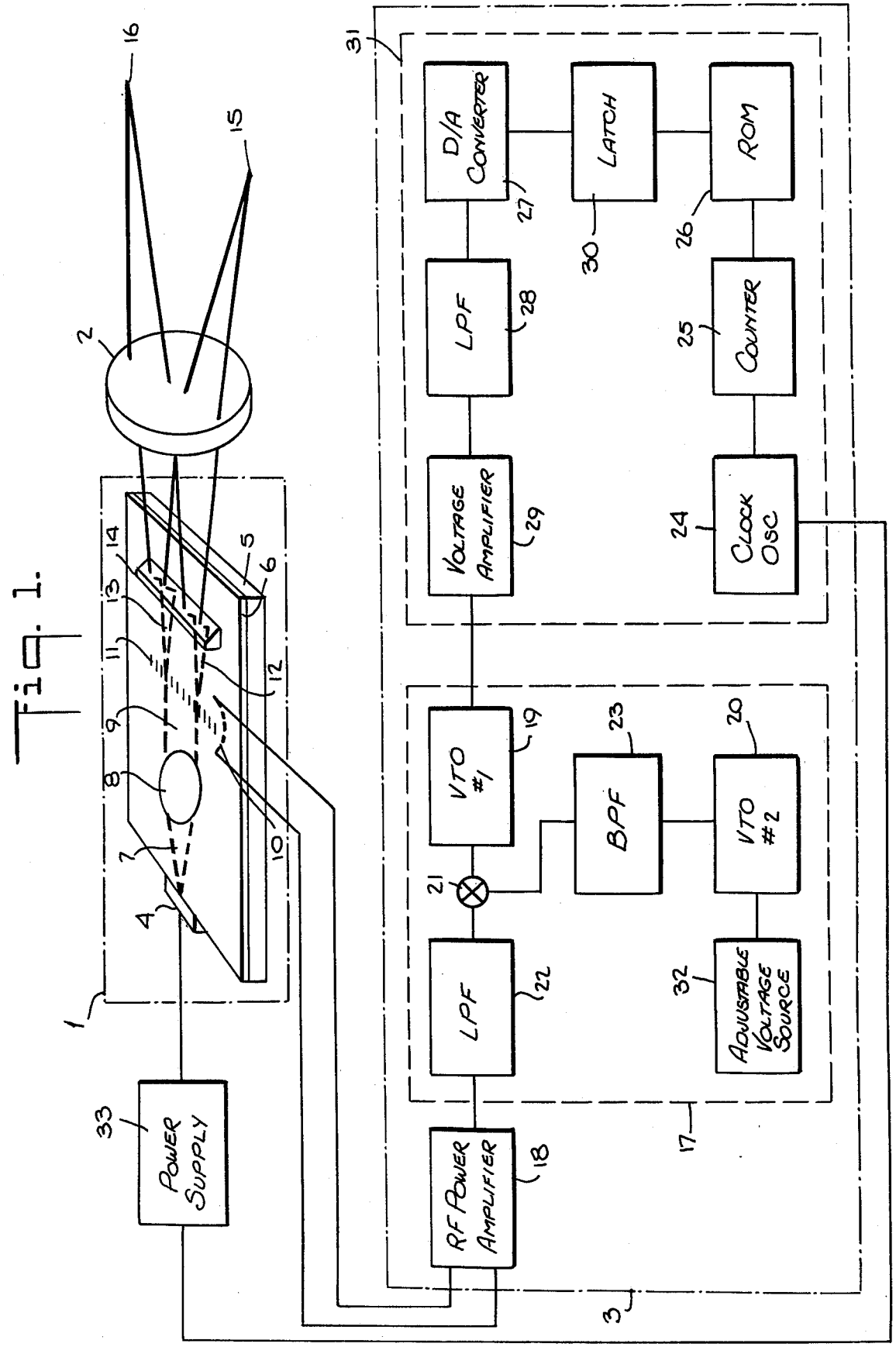
FIG. 1 is a schematic diagram of a scanning system according to the present invention showing a scanner module and imaging lens in perspective and a SAW drive circuit in block form.

FIG. 1 shows a light beam scanning system according to the present invention. The system consists of a scanner module 1, an imaging lens 2 and a SAW drive circuit 3.

Scanner module 1 has a laser diode light source 4 butt-coupled to one end of a Ti in-diffused $LiNbO_3$ thin film waveguide 6 formed on a $LiNbO_3$ substrate 5. Because the waveguide requires low-loss and high efficiency of the surface acoustic wave and the light wave, a ferroelectric crystal substance such as Y-cut $LiNbO_3$ is particularly suitable in forming a waveguide providing effective overlap between these waves. Divergent light 7 projected into waveguide 6 from laser diode 4 is then collimated into a parallel light beam 9 by a thin film collimator lens 8, the beam width of the parallel light beam being determined in accordance with the number of resolvable points of the scanner module. It will be appreciated that in order to get a high number of resolvable points, a wide beam width is required. Moreover, because some lithium is out-diffused during the formation of the Ti in-diffused waveguide it is preferable that the $TM_0$ mode be used since the out-diffused lithium will have no effect on the light propagation. While the $TE_0$ mode could also be used, it will possibly couple to the thick out-diffused region thereby reducing light confinement and acousto-optical efficiency.

Three types of thin film lenses are available as the collimator lens 8. The first type is a grating lens which is made by depositing a one dimensional Fresnel zone plate pattern on the waveguide. The advantages of a grating lens are its simplicity in both design and fabrication. However, for a high numerical aperture lens the grating pitch of the grating lens becomes very small and fabrication of the grating by photolithography becomes too difficult.

The second type of lens is a geodesic lens. This type of lens is made by digging an approximately spherical depression into substrate 5 prior to formation of the waveguide 6 thereon and then forming the waveguide. Therefore, it is necessary that the substrate be relatively thick.

The third type of lens is a Luneburg lens which is made by depositing a domed thin layer onto the waveguide 6. The lens material must have a higher index of refraction than that of the waveguide 6. Thus, for a Ti in-diffused $LiNbO_3$ waveguide, the index of the Luneburg lens must be higher than approximately 2.27 for the $TM_0$ mode for a laser diode of 0.8300 micron wavelength in air or approximately 2.29 for an He-Ne laser of 0.6328 micron wavelength in air.

In the case of an ideal lens, a high numerical aperture value means a large resolving power. For a Luneburg lens, a high index ratio of the lens material and the waveguide material permits a relatively short focal length and therefore a high resolving power. Accordingly, $As_2S_3$, which has an index of approximately 2.37 or 2.39 for the above noted lasers, respectively, is preferably used as the material for evaporation to form the Luneburg lens on a Ti in-diffused $LiNbO_3$ waveguide, since such a Luneburg lens has a large resolving power. In addition evaporated $As_2S_3$ has the further advantage of low scattering loss because of its amorphous structure.

It will be appreciated that while a Luneburg lens formed by evaporating $As_2S_3$ will be primarily $As_2S_3$, the as-deposited lens may include some arsenic-sulfur compounds of different proportions.

The waveguide 6 also incorporates a multiple tilted SAW transducer array 10 which satisfies the Bragg condition. SAW transducer array 10 is driven by a SAW drive circuit 3 which applies an RF chirped signal thereto. In accordance with this signal, array 10 generates a surface acoustic wave (SAW) 11 which diffracts a portion of parallel light beam 9 to become a first-order diffracted beam 12. This first-order beam 12 and the zero-order beam 13 are coupled out by a prism-coupler 14 to form beam spots 15 and 16, respectively, by means of imaging lens 2. Alternatively the light may be directly output through a polished end face of the waveguide.

The deflection angle $2\theta_B$, i.e., the angle between the first-order and zero-order beams depends on the frequency $f_a$ of the input signal to array 10 and is given by the following formula:

$$2\theta_B = 2 \sin^{-1}\left[\frac{\lambda_o f_a}{2nv_a}\right]$$

where
$\lambda_o$: wavelength in air
$n$: mode index of the waveguide
$v_a$: SAW velocity in $LiNbO_3$.

Thus, beam spot 15 is scanned by sweeping the frequency $f_a$.

The number of resolvable spots (N) which can be achieved in any waveguide scanning system is determined by the following equation:

$$N = (2\Delta\theta_B/\phi_{diff})$$

where $\phi_{diff}$ is the divergence angle of a nominally collimated beam. For $N=1,000$ and $2\Delta\theta_B=4°$, since $\theta_B$ is a function of $f_a$, the requisite frequency range for a parallel beam 6 mm. wide is approximately 700 MHz.

Referring now to the block diagram in FIG. 1, the SAW drive circuit 3 includes a generator 31, heterodyning RF sweep oscillator 17, and an RF powder amplifier 18.

It is convenient to pick the operating frequency range below one octave. While the desired 700 MHz frequency range can be met at high operating frequencies, it is at the same time important that the driving frequency be kept relatively low so as not to exceed about 1 GHz. There are several distinct reasons in this requirement. First of all as the frequency increases, the finger thickness of the SAW transducers must decrease and present day photolithographic methods pose a practical limit on the operating frequencies. Secondly, attenuation of the SAW waves increases as the square of the frequency. Finally for most waveguides the amount of overlap between the optical and acoustic waves diminishes with higher frequency and shorter acoustic wavelength.

In the present invention a varactor tuned oscillator (VTO) is used as a linear RF sweep generator. However, a VTO cannot attain the required bandwidth at low frequencies because the frequency range will exceed one octave. Therefore in the present SAW drive circuit, stable oscillation at a low frequency range between 300 MHz~1 GHz is achieved by means of the heterodyning RF sweep oscillator 17 which consists of a first varactor tuned oscillator (VTO #1) 19, a second varactor tuned oscillator (VTO #2) 20 acting as a local oscillator, a double balanced mixer 21, low pass filter (LPF) 22 and band pass filter (BPF) 23. While any fixed voltage oscillator may be used in place of VTO #2, a varactor is preferable since it permits band shift for final alignment.

Although a VTO is useful in order to realize a high sweep rate, generally the output frequency of the VTO is not linearly proportional to the input voltage. Consequently, a non-linear voltage ramp input singal is provided to compensate for this unavoidable non-linearity. This input signal is provided from a non-linear ramp generator 31 which includes a clock oscillator 24, a binary counter 25, read only memory (ROM) 26, latch 30, digital-to-analog converter (D/A) 27, low pass filter (LPF) 28, and voltage amplifier 29. The D/A conversion time and ROM access time dictate the number of samples $P_s$ and thus dictate the error in the linearity compensation.

According to the desired number of samples $P_s$, clock oscillator 24 must output clock signals to counter 25 at a clock frequency $f_c$:

$$f_c = (P_s/t_1)$$

where $t_1$ is the time for one scan (without flyback time).

ROM 26 contains digital words that represent the analog voltages needed to make a nonlinear ramp. The binary counter 25 addresses successive locations in ROM 26 and the digital words read out are then converted to analog voltages by means of D/A 27. The inherent quantization error of D/A 27 causes a stairstep output which can be eliminated by using LPF 28. The output of LPF 28 is then amplified to a suitable tuning level for VTO #1.

While the ROM 26 is being accessed, the output lines are in an indeterminate state which can cause the D/A 27 to prouce an incorrect analog voltage. Therefore a latch is added between ROM 26 and D/A 27 to overcome this problem. The valid ROM 26 data is clocked into latch 30 only after ROM 26 has had a chance to settle. The latch 30 then retains this value until ROM 26 is ready with the next value.

Generator 31 thus assures that the output frequency $f_1$ of VTO #1 has good linearity.

The input voltage of VTO #2 is a constant ($V_2$), so VTO #2 oscillates at a constant frequency $f_2$. This voltage is applied from a manually adjustable voltage source 32.

The double balanced mixer 21 multiplies the frequency sweep (RF Port) with the local oscillator (LO Port) generating the sum and difference frequencies, $f_1+f_2$ and $|f_1-f_2|$, of these inputs at the intermediate frequency port (IF). The low pass filter 22 filters out the sum frequencies while passing the difference frequencies. Since the local oscillator frequency, $f_2$, is constant, the linear sweep, $f_1$, is translated down in frequency by $f_2$.

The low pass filter (LPF) 22 also filters out all of the spurious signals. Such spurious signals are generated when the mixer 21 multiplies harmonics of the RF and LO signals. The local oscillator can be made to have virtually no harmonics by using a high Q band pass filter BPF 23. The output of the LPF 22 ($f_a$) is amplified by the RF power amplifier 18 to a suitable power level for driving array 10.

In order to produce N resolvable spots, it is necessary to modulate the laser light N times in synchronism with each chirp. This may be done by using clock oscillator 24 to output $P_s$ pulses to the counter 25 and N pulses for beam modulation during each chirp by using separate counters and a common clock, two separate but synchronous clocks or any other conventional means for synchronizing the acoustic and optical systems. Where the light source is a laser diode, the N clock pulses can be applied to a power supply 33. For a gas laser these clock pulses are applied to a separate modulator.

Figure 2:
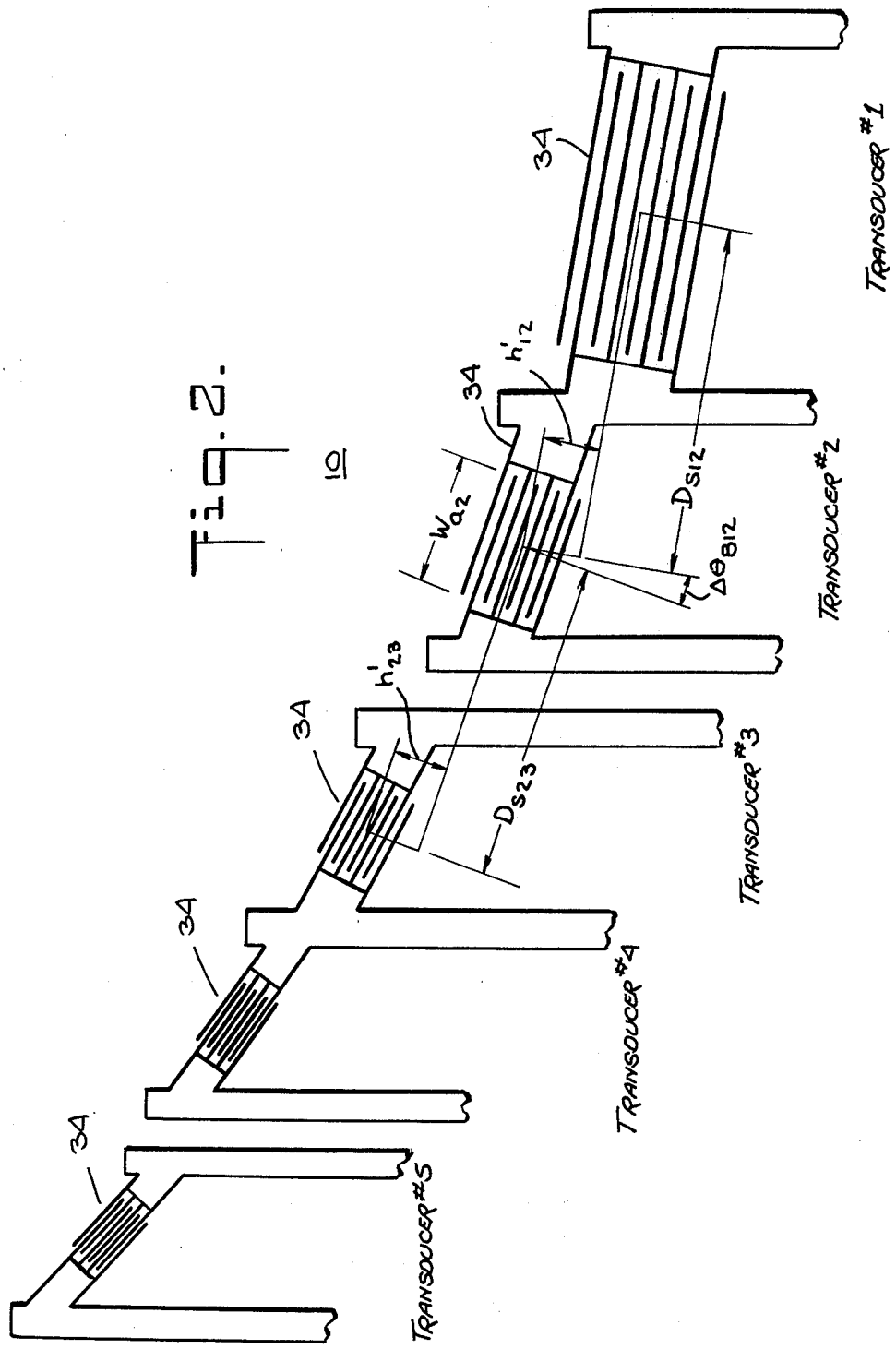
FIG. 2 illustrates a tilted SAW transducer array incorporated in the FIG. 1 system.

FIG. 2 shows a tilted SAW transducer array 10 for use in the present invention. It consists of five transducers 34 each having four finger pairs and having staggered center frequencies corresponding to different frequency bands of the composite bandwidth and propagation axes tilted with respect to each other. Of course, different numbers of transducers and/or finger pairs may be used. The period and center frequency of each transducer are chosen so that the fixed optical beam is incident at the Bragg angle for the center frequency and so that the half-power point of adjacent transducers occurs at the same frequency. The tilt angle between adjacent transducers is set equal to the difference in Bragg angles ($\Delta\theta_{Bij}$) at the respective center frequencies of the adjacent transducer. This enables the multiple tilted transducer array to satisfy the Bragg condition in each of the frequency bands and thus a wide composite frequency band is realized.

For positioning each transducer, it is required that the optical path difference between the two optical rays that contribute to the single diffracted ray be an integral multiple of one optical wavelength in the waveguide 6 while the acoustic paths to the interaction points are equal. This matching reduces the demand on the phase matching network of the driving circuitry and may eliminate it entirely.

The imaging lens 2 has an anamorphic $f-\theta$ characteristic to assure constant scanning velocity and a circular light beam spot.

Illustrative Design Parameters (a) Deflection angle in the waveguide: $2\Delta\theta_B=4°$
(b) resolvable points: $N_r=1000$ spots/scan
(c) Flyback time: $t_{fb}=2$ $\mu$sec
(d) Scan rate: D=16000 scans/sec
(e) Effective index in the waveguide (Ti-LiNbO$_3$): n=2.25
(f) Wavelength of laser diode light source: $\lambda_o=0.85$ $\mu$m
(g) SAW velocity: $v_a=3.5\times 10^3$ m/sec From specification (a)–(d), using the equation for Bragg diffraction, with electronic and fabrication considerations:

(h) SAW frequency bandwidth: f=700 MHz
(i) Effective frequency range (with margin for fabrication): $f'_a=335$ MHz–1.065 GHz
(j) Optical beam width: d=6 mm.

Utilizing a slightly modified tilted SAW transducer array design procedure by C. S. Tsai, a transducer configuration as shown in Table 1-2 was produced.

TABLE 1

| # | $v_-$ GHz | $v_o$ GHz | $v_+$ GHz | $w_a$ mm | $\Lambda_o$ $\mu$m | $\Lambda_o/4$ $\mu$m |
|---|---|---|---|---|---|---|
| 1 | 0.3350 | 0.3786 | 0.4222 | 1.7898 | 9.2447 | 2.3112 |
| 2 | 0.4222 | 0.4771 | 0.5321 | 1.1269 | 7.3356 | 1.8339 |
| 3 | 0.5321 | 0.6013 | 0.6705 | 0.7095 | 5.8207 | 1.4552 |
| 4 | 0.6705 | 0.7578 | 0.8451 | 0.4467 | 4.6186 | 1.1547 |
| 5 | 0.8451 | 0.9550 | 1.0650 | 0.2813 | 3.6648 | 0.9162 |

N = 4, M = 5

TABLE 2

| Transducer Pair # | $v_c$ (GHz) | $\theta_c$ (Deg) | $\Delta\theta_{Bij}$ (Deg) | $D_s$ (mm) | $h'$ ($\mu$m) |
|---|---|---|---|---|---|
| 1–2 | 0.4222 | 1.2899 | 0.301096 | 1.8681 | 45.8024 |
| 2–3 | 0.5321 | 1.6257 | 0.379518 | 1.1932 | 36.4006 |
| 3–4 | 0.6705 | 2.0489 | 0.478409 | 0.7728 | 28.9739 |
| 4–5 | 0.8451 | 2.5825 | 0.603156 | 0.6056 | 27.7038 |

In the foregoing tables, the following notations are used (see FIG. 2):

M: The number of transducers in the array
N: The number of finger pairs in one elemental transducer
$v_{-i}$: Lower-3dB point for transducer i
$v_{+i}$: Upper-3dB point for transducer i
$v_{Oi}$: center frequency for transducer i
$\Lambda_{Oi}$: Acoustic wavelength at center frequency for transducer i
$\Delta\theta_{Bij}$: Difference between Bragg angles for two specified adjacent transducers i and j
$v_c$: Crossover frequency for two adjacent transducers
$w_{ai}$: Acoustic aperture of transducer i
$\theta_c$: Bragg angle for two adjacent transducers at the crossover frequency
$D_s$: Horizontal offset between adjacent transducers
$h'$: Vertical offset between adjacent transducers The heterodyning RF sweep circuit may utilize a 1.2 GHz local oscillator to beat down a 1.5–2.2 GHz RF sweep. The circuit produces a 300 MHz to 1.0 GHz sweep.

The digital nonlinear ramp generator may include 8 bit bipolar PROMs and fast D/A's which enable the use of 640 sample points.

Having thus described the invention with particular reference to the preferred forms thereof, it will be obvious to those skilled in the art to which the invention pertains, after understanding the inventor, that various changes and modifications may be made therein without departing from the scope of the invention as defined by the claims appended hereto. For example, other materials may be used for the waveguide and/or the collimator lens.

What is claimed is:

1. A light beam scanning system comprising:
   an optical waveguide;
   SAW transducer means for generating surface acoustic waves in said waveguide; and
   driving means for driving said SAW transducer means, said driving means comprising a heterodyning RF sweep generator having a varactor tuned oscillator and a constant frequency oscillator.

2. A light beam scanning system according to claim 1, wherein said driving means further comprises a digital linearization circuit for compensating for the non-linearity of the frequency of said varactor tuned oscillator.

3. A light beam scanning system according to claim 1 or 2, wherein said constant frequency oscillator is another varactor tuned oscillator.

4. A light beam scanning system comprising:
   an optical waveguide;
   SAW transducer means for generating surface acoustic waves in said waveguide; and
   driving means for driving said SAW transducer means, said driving means comprising a varactor tuned oscillator and a digital linearization circuit for compensating for the non-linearity of the frequency of said varactor tuned oscillator.

5. A light beam scanning system according to claim 1, 2 or 4, wherein said waveguide is made of titanium in-diffused $LiNbO_3$.

6. A light beam scanning system according to claim 1, 2 or 4, wherein said SAW transducer means is a multiple tilted SAW transducer array.

7. A light beam scanning system according to claim 1, 2 or 4, further comprising a Luneburg lens comprising $As_2S_3$ provided on said waveguide.

8. A light beam scanning system comprising:
   an optical waveguide;
   a Luneburg lens comprising $As_2S_3$ provided on said waveguide;
   SAW transducer means for generating surface acoustic waves in said waveguide; and
   driving means for driving said SAW transducer means with a linear chirp signal.

9. A light beam scanning system according to claim 8, wherein said waveguide is made of titanium in-diffused $LiNbO_3$.

10. A light beam scanning system according to claim 1, 4 or 8, wherein said drive means is constructed to modulate the light applied to said waveguide in synchronism with the driving of said SAW transducer means.

* * * * *